US012415203B2

(12) United States Patent
Tomasi et al.

(10) Patent No.: US 12,415,203 B2
(45) Date of Patent: Sep. 16, 2025

(54) SYSTEM AND METHOD FOR AUTOMATICALLY APPLYING A BEAD OF SEALANT WITHIN A PERIPHERAL GROOVE

(71) Applicant: Comau S.p.A., Grugliasco (IT)

(72) Inventors: Daniele Tomasi, Grugliasco (IT); Valeria Serpi, Grugliasco (IT); Giovanni Di Stefano, Grugliasco (IT); Nicola Longo, Grugliasco (IT); Luca Zacheo, Grugliasco (IT); Gianluca Montarsolo, Grugliasco (IT)

(73) Assignee: Comau S.p.A., Grugliasco (IT)

( * ) Notice: Subject to any disclaimer, the term of this patent is extended or adjusted under 35 U.S.C. 154(b) by 0 days.

(21) Appl. No.: 18/284,912

(22) PCT Filed: Mar. 29, 2022

(86) PCT No.: PCT/IB2022/052873
§ 371 (c)(1),
(2) Date: Sep. 29, 2023

(87) PCT Pub. No.: WO2022/208335
PCT Pub. Date: Oct. 6, 2022

(65) Prior Publication Data
US 2024/0189858 A1 Jun. 13, 2024

(30) Foreign Application Priority Data
Apr. 1, 2021 (IT) ........................ 102021000008159

(51) Int. Cl.
*B05C 11/10* (2006.01)
*B05C 5/02* (2006.01)

(52) U.S. Cl.
CPC ........ *B05C 11/1021* (2013.01); *B05C 5/0216* (2013.01)

(58) Field of Classification Search
None
See application file for complete search history.

(56) References Cited

U.S. PATENT DOCUMENTS 3,303,816 A * 2/1967 Lauring .................. B05C 5/005 427/420
6,001,181 A 12/1999 Bullen
(Continued)

FOREIGN PATENT DOCUMENTS

DE 10 2008 015834 A1 10/2009
WO 2018/204671 A1 11/2018
(Continued)

*Primary Examiner* — Charles Capozzi
(74) *Attorney, Agent, or Firm* — Young Basile Hanlon & MacFarlane, P.C.

(57) ABSTRACT

A system for automatically applying a bead of sealant within a peripheral groove defined between two elements coupled to each other and having dimensions that are not strictly predetermined. In one example, a manipulator robot includes a sealant dispensing head including a dispensing nozzle and a profilometer. An electronic controller moves the sealant dispensing head for a first pass along the peripheral groove to detect the profile of the facing lateral surfaces defining the peripheral groove. The correct amount of sealant is calculated based on the detected profile of the groove. The electronic controller moves the dispensing head for a second pass to dispense the calculated amount of sealant in the peripheral groove. In one example, the sealant is dispensed with a constant flow rate and the speed of movement of the dispensing nozzle varies to apply the calculated amount of sealant to each portion of the peripheral groove.

10 Claims, 12 Drawing Sheets

(56) References Cited

U.S. PATENT DOCUMENTS

| | | | | |
|---|---|---|---|---|
| 6,969,427 | B1 * | 11/2005 | Noles, Jr. ............ | F16L 55/1645<br>137/15.01 |
| 2010/0180711 | A1 | 7/2010 | Kilibarda et al. | |
| 2018/0009000 | A1 * | 1/2018 | Shang ...................... | B05D 1/26 |

FOREIGN PATENT DOCUMENTS

| | | | |
|---|---|---|---|
| WO | 2021/090159 | A1 | 5/2021 |
| WO | 2022/208372 | A1 | 10/2022 |

* cited by examiner

SYSTEM AND METHOD FOR AUTOMATICALLY APPLYING A BEAD OF SEALANT WITHIN A PERIPHERAL GROOVE

CROSS-REFERENCE TO RELATED APPLICATION(S)

This application is filed pursuant to 35 U.S.C. § 371 claiming priority benefit to PCT/IB2022/052873 filed Mar. 29, 2022, which claims priority benefit to Italian Patent Application No. 102021000008159 filed Apr. 1, 2021, the contents of both applications are incorporated herein by reference in the entirety for all purposes.

TECHNICAL FIELD

The present invention relates to a system and a method for automatically applying a bead of a sealant within a peripheral groove.

BACKGROUND

Although the present invention is of general application, it was initially developed with reference to assembling a lid on a container for a battery pack for powering an electric traction motor of an electric vehicle. In the assembled condition of the lid on the container, these elements define between them, along the lateral surface of the container, a peripheral groove, which must be filled with a bead of a sealing agent, having the function of both rigidly connecting the lid to the container and of sealing the inside of the container from the outside.

A usual technique in applications of this type is to apply a bead of sealant along a peripheral edge of the container, before the lid is applied to the container. By operating in this way, it is also possible to deposit an excess quantity of sealant on the edge of the container, since the subsequent application of the lid on the container, with which the correct adhesion between the two elements is ensured, causes the leakage of any excess quantity of sealant. In the specific application mentioned above, however, there is a need to ensure that the bead of sealant is applied after the lid has been applied to the container. In this case, if the sealant is applied in an automated processing station, with the aid of a robot carrying a sealant dispensing head, it is necessary to measure the amount of sealant applied relatively precisely. However, the required amount of sealant cannot be predetermined, due to the inaccuracies in the geometry of the elements (in the example cited the container and the lid) defining the peripheral groove wherein the sealant is to be deposited. In the case, for example, of the specific application mentioned, the lid is made of plastic material, and the container of aluminum alloy, and they are made with manufacturing tolerances that are not particularly tight, so that, as indicated above, the profile of the lateral surfaces defining the peripheral groove varies continuously along the perimeter of the groove, and also varies between different specimens of the products advancing along the production line. Therefore, the size of the peripheral groove varies along the perimeter of the groove and varies from product to product.

There is, therefore, a need for a system and a method that allow the application of the bead of sealant to be carried out in a completely automated and rapid way, and that nevertheless guarantee the application of the correct quantity of sealant in the various portions of the peripheral groove along the perimeter of the peripheral groove, despite the variability of the dimensions of the groove, both along the perimeter of the same product, and from product to product along the production line.

SUMMARY

The object of the present invention is, therefore, to produce a system and a method for automatically applying a bead of sealant within a peripheral groove defined between two elements coupled to each other and having dimensions that are not strictly predetermined, which are able to resolve the problems outlined above.

In particular, one object of the invention is to produce a system and a method for automatically applying a bead of sealant that allows the sealant to be applied automatically and in a short time and that, nevertheless, guarantees the dispensing of the correct quantity of sealant within each portion of the peripheral groove along its perimeter.

An additional object of the invention is to produce a system and a method of the type specified above that are able to achieve the aforesaid objective by simple, low-cost means.

An additional object of the invention is to produce a system and a method for applying a bead of sealant in a peripheral groove defined between two elements coupled together, which makes use of a sealant dispensing head equipped with a dispensing nozzle mounted in a displaceable manner, made of plastic material, and having a geometry that is not rigorously predetermined, nevertheless ensuring precise control of the position of the dispensing end of the dispensing nozzle, with simple and low-cost means.

One or more of the aforesaid objects is achieved, according to the invention, by providing a system for automatically applying a bead of a sealant within a peripheral groove, which is defined between two elements coupled to each other and having dimensions that are not strictly predetermined, so that the peripheral groove has two facing lateral surfaces whose profile is continuously variable along the perimeter of the peripheral groove, said system comprising:

- a manipulating robot provided with a sealant dispensing head, including a sealant dispensing nozzle and a pump for feeding a mono-component or two-component sealant, coming from one or more sealant tanks,
- an electronic controller programmed to move the sealant dispensing head along said peripheral groove, at the same time controlling the aforesaid pump in such a way as to apply a bead of sealant within the peripheral groove,
- wherein the sealant dispensing head carried by the manipulating robot is provided, adjacent to the dispensing nozzle, with a profilometer of a type having a contactless operation, and
- wherein the electronic controller is programmed for:
  - controlling a first pass of the sealant dispensing head along the peripheral groove, without dispensing any sealant, while activating the profilometer to detect the profile of the two facing lateral surfaces of the peripheral groove, along the perimeter of the peripheral groove,
- processing data relating to the profiles of the two lateral surfaces of the peripheral groove, as detected by the profilometer in the aforesaid first pass, and calculating the correct quantity of sealant to be applied within each portion of the peripheral groove along the perimeter of the peripheral groove,
- carrying out a second pass of the sealant dispensing head along the peripheral groove, while dispensing sealant in the aforesaid calculated quantity in each portion of the peripheral groove along the perimeter of the peripheral groove.

In a preferred embodiment, the aforesaid pump is configured to activate a constant and predetermined delivery flow rate of the sealant and that the electronic controller is configured to dynamically vary the speed of movement of the dispensing nozzle during the second pass, so as to apply the calculated amount of sealant in each portion of the peripheral groove along the perimeter of the peripheral groove.

According to an additional characteristic, the system of the invention also comprises:

an electronically-controlled system for locating the aforesaid elements defining the peripheral groove in a predetermined position at a working area, and a vision system configured to detect, directly or indirectly, the position of said dispensing nozzle carried by the robot, and to send data indicative of said position to the electronic controller.

In the preferred embodiment, the aforesaid dispensing nozzle is constituted by an element of plastic material mounted in a replaceable manner, the geometry of which is not rigorously predetermined. The sealant dispensing head carries a reference element, having a predetermined geometry (for example, a steel stylus), adjacent to the dispensing nozzle, and having a position with respect to the manipulator robot that is known by said electronic controller. The system also comprises a vision system configured to detect the relative position of a dispensing end of the dispensing nozzle with respect to the aforesaid element, and to send data indicative of said relative position to the electronic controller.

According to another preferred characteristic, the aforesaid one or more sealant tanks are carried by the robot and are of a refillable and/or replaceable type, so that the movements of the robot are not hindered by pipes for connection to a sealant tank placed on the ground.

The invention also relates to the sealant application method implemented by means of the system described above.

BRIEF DESCRIPTION OF THE DRAWINGS

Further characteristics and advantages of the present invention will become apparent from the description that follows with reference to the attached drawings, provided by way of non-limiting example, wherein.

DETAILED DESCRIPTION

The present invention relates to a system and a method for automatically applying a bead of a sealant within a peripheral groove, which is defined between two elements coupled to each other and which has dimensions that are not strictly predetermined, so that the peripheral groove has two facing lateral surfaces whose profile is continuously variable along the perimeter of the peripheral groove.

In the present description, the term "sealant" is used to indicate both the case of a fluid having only sealing properties, and the case of a fluid having sealing properties and also adhesive properties and, in general, the case of any adhesive fluid.

Figure 2:
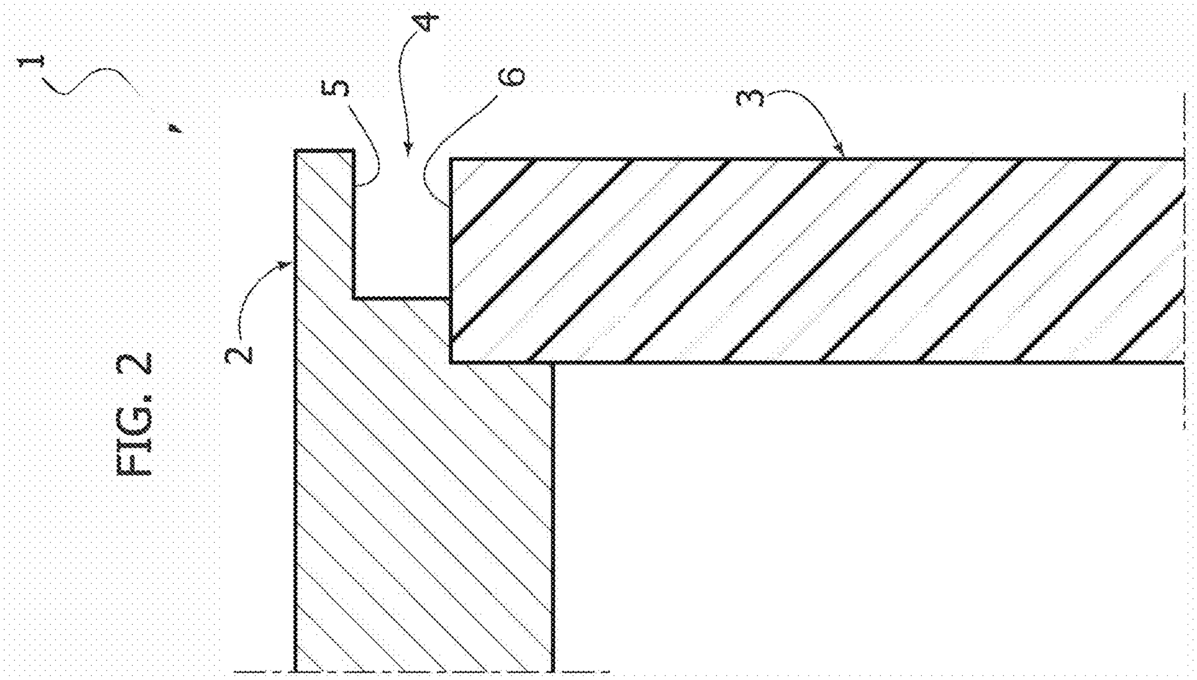
FIG. 2 is a schematic partial cross-sectional view of an enlarged-scale detail of the container of FIG. 1, showing the peripheral groove defined between the container and its lid.
Figure 1:
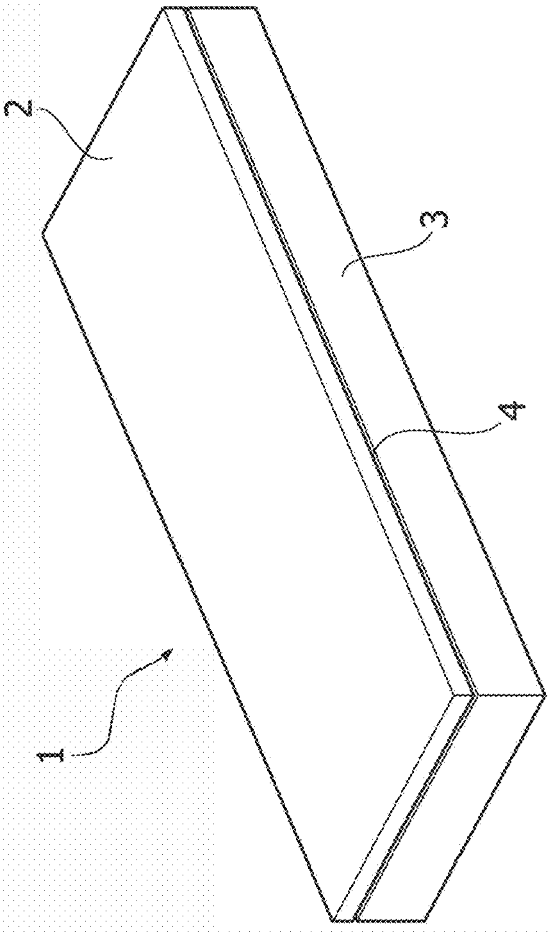
FIG. 1 is a schematic perspective view of a container for a battery pack for powering electric traction motors of electric vehicles to which the method according to the invention is applicable.

In FIGS. 1, 2, reference 1 indicates—in its entirety—a container for a battery pack for powering an electric motor of an electric vehicle, comprising a container body 3, for example, of aluminum and a lid 2, for example, of plastic material.

As can be seen in particular in FIG. 2, along the lateral surface of the container 1, a peripheral groove 4 is defined between the container body 3 and the lid 2 applied above it, said groove having two facing lateral surfaces 5, 6. With reference to FIG. 2, the lateral surface 5 delimits the peripheral groove 4 at the top, and is defined by a protruding edge of the lid 2, while the lateral surface 6 delimits the peripheral groove 4 below, and is defined by a peripheral upper surface of the lateral wall of the container body 3.

Figure 3:
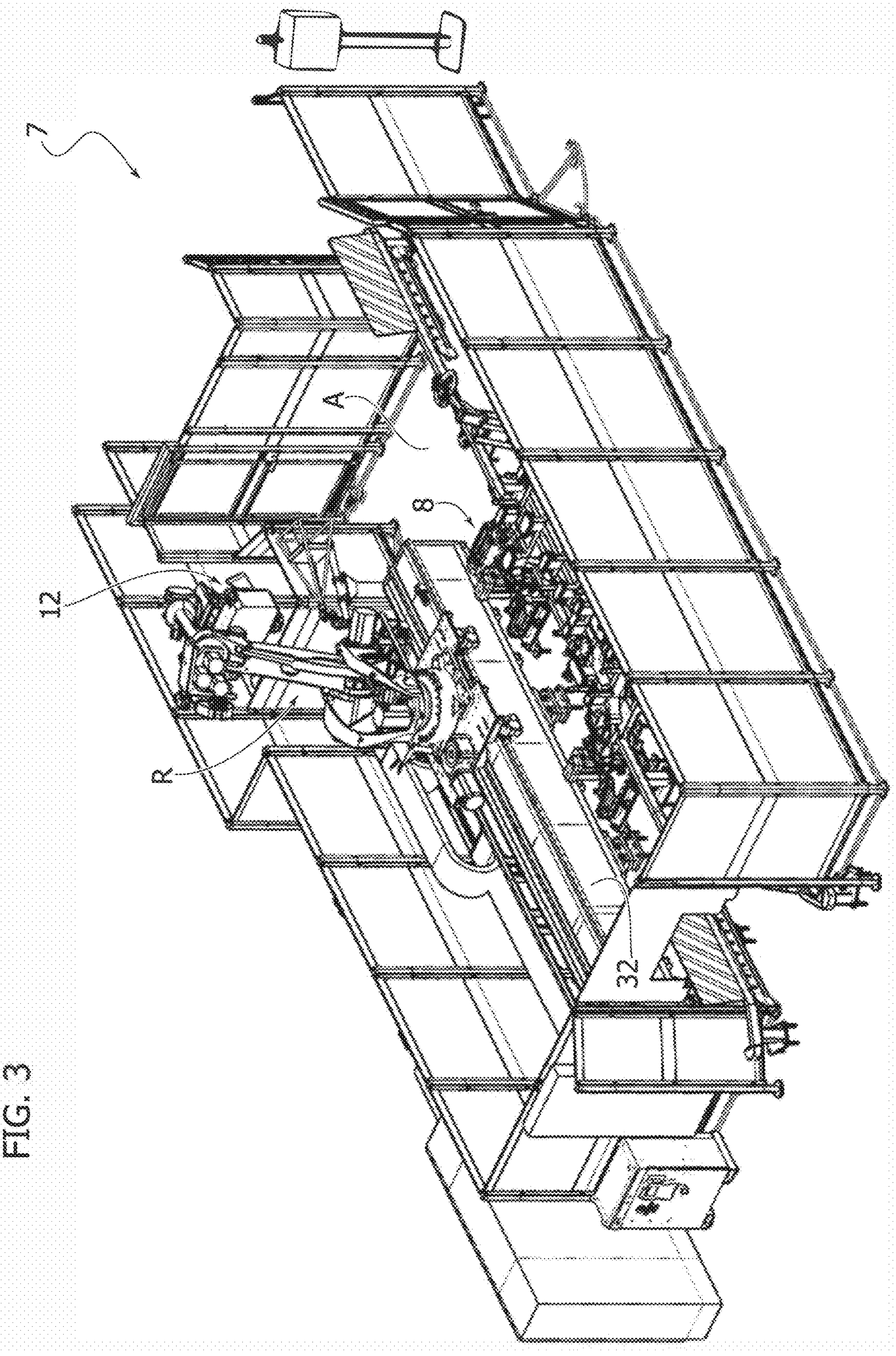
FIGS. 3-5 are two perspective views and a plan view, respectively, of a station of a production plant equipped with the system according to the invention, for applying a bead of sealant into the peripheral groove of the container of FIGS. 1, 2.
Figure 4:
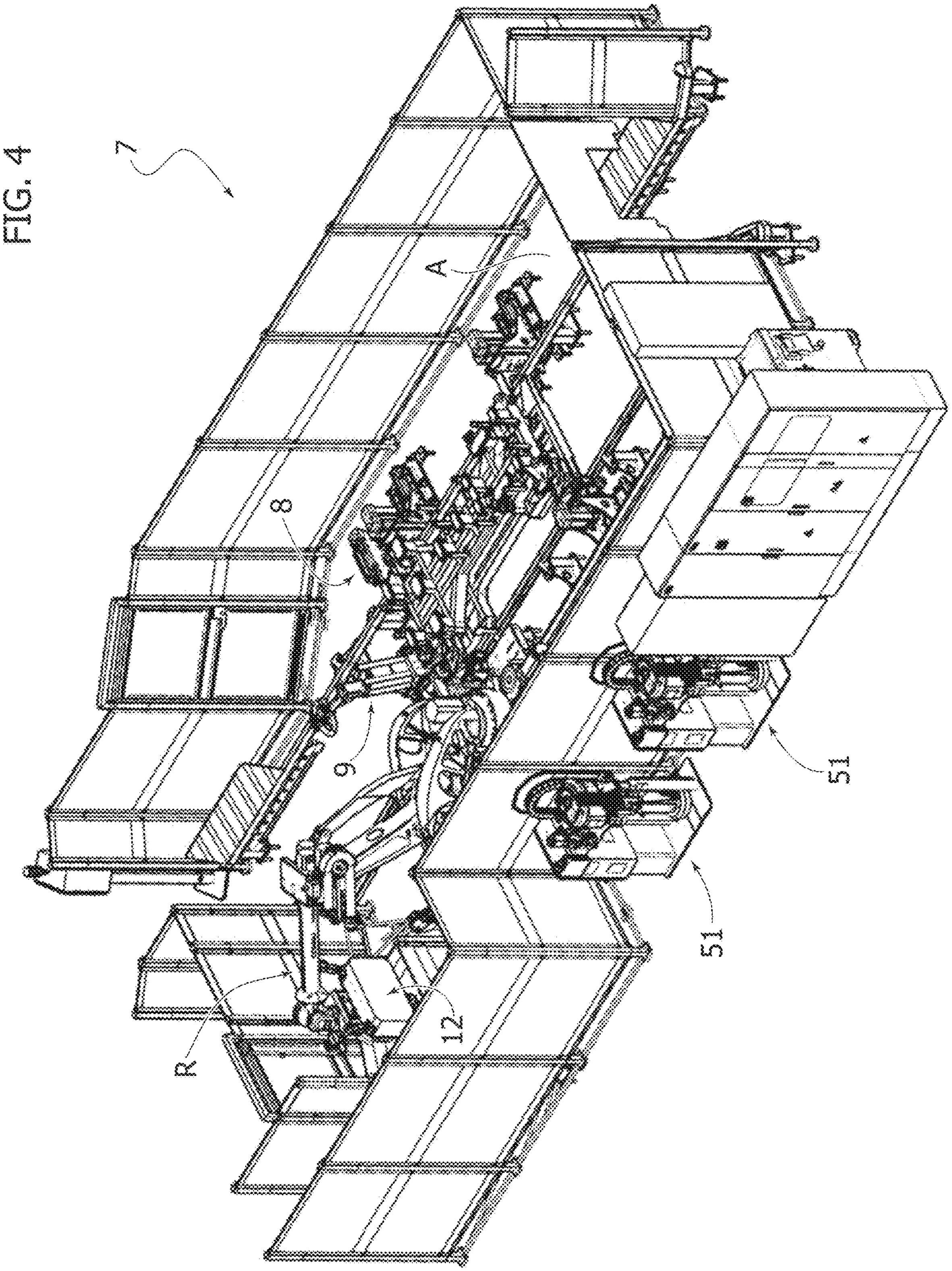
Figure 5:
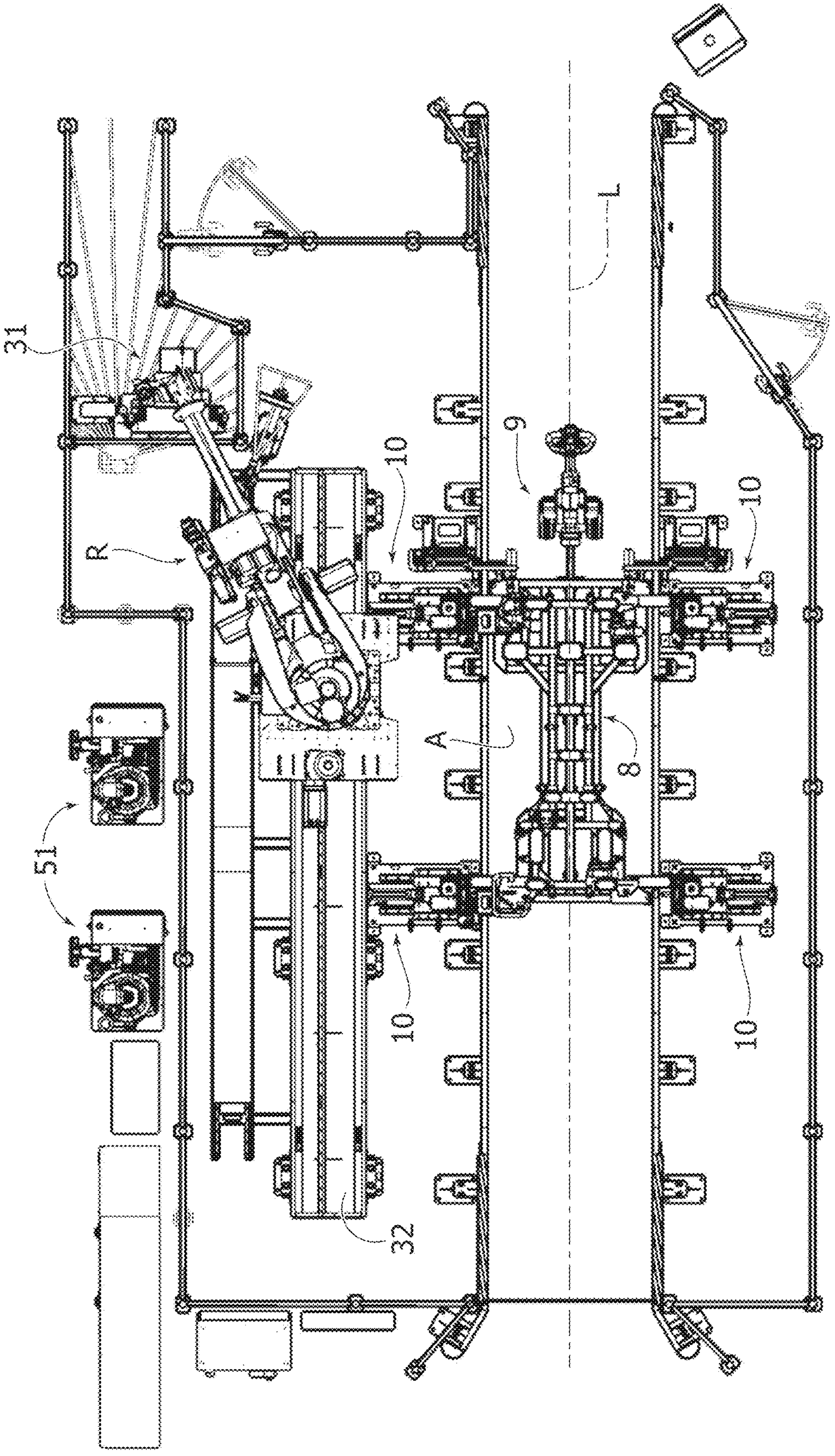

FIGS. 3-5 show, purely by way of example, a station 7 of a battery pack production plant for powering electric traction motors of electric vehicles, including a working area A intended to receive a workpiece-holder frame 8 carrying the workpiece, i.e. in the example cited the container 1. Again purely by way of example, in the illustrated case, the workpiece-holder frame 8 is transported to the working area A on a manually-drawn trolley. In a per se known way, the workpiece-holder frame 8 is equipped with supporting and reference elements to support a container 1, consisting of the container body 3 and the lid 2 mounted above it, in a strictly predetermined position with respect to the workpiece-holder frame 8. When the workpiece-holder frame 8 reaches the working area A transported by the trolley 9, the workpiece-holder frame 8 is lifted and moved away from the trolley by means of vertically-movable support members associated with stationary structures 10 arranged on the two sides of the working area A along a conveying line L which is crossed by the trolley 9. The aforesaid vertically-movable support members lift the workpiece-holder frame 8 up to a predetermined height Z. At the same time, additional centering members associated with the stationary structures 10 engage corresponding engagement elements carried by the workpiece-holder frame 8 to locate the piece-holder frame 8 into position with respect to two horizontal directions (X, Y) orthogonal to each other and also with respect to possible rotations of the workpiece-holder frame 8 in the horizontal plane. The constructive details of the stationary structures 10 and of the aforesaid vertically-movable support members and of the auxiliary centering members associated therewith are not described here, as they can be made in any known way and, also, as these details, taken on their own, do not fall within the scope of the present invention. A preferred and innovative embodiment of these elements is the subject of a co-pending patent application by the same Applicant.

Preferably, the aforesaid vertically-movable support members and the aforesaid auxiliary centering members are driven by servo-controlled electric motors, in such a way that an electronic controller E of the processing station (schematically illustrated in FIG. 8) knows the position of the container 1 with respect to an X, Y, Z coordinate system in the condition wherein the container 1 must be subjected to the application of the bead of sealant.

Applying the bead of sealant into the peripheral groove 4 of the container 1 is carried out by means of a robot manipulator R.

In the illustrated example, the manipulator robot R is a multi-axis robot, comprising a series of mutually articulated robot elements, ending with an attachment flange 11 to which a sealant dispensing head 12 is rigidly connected.

Figure 6:
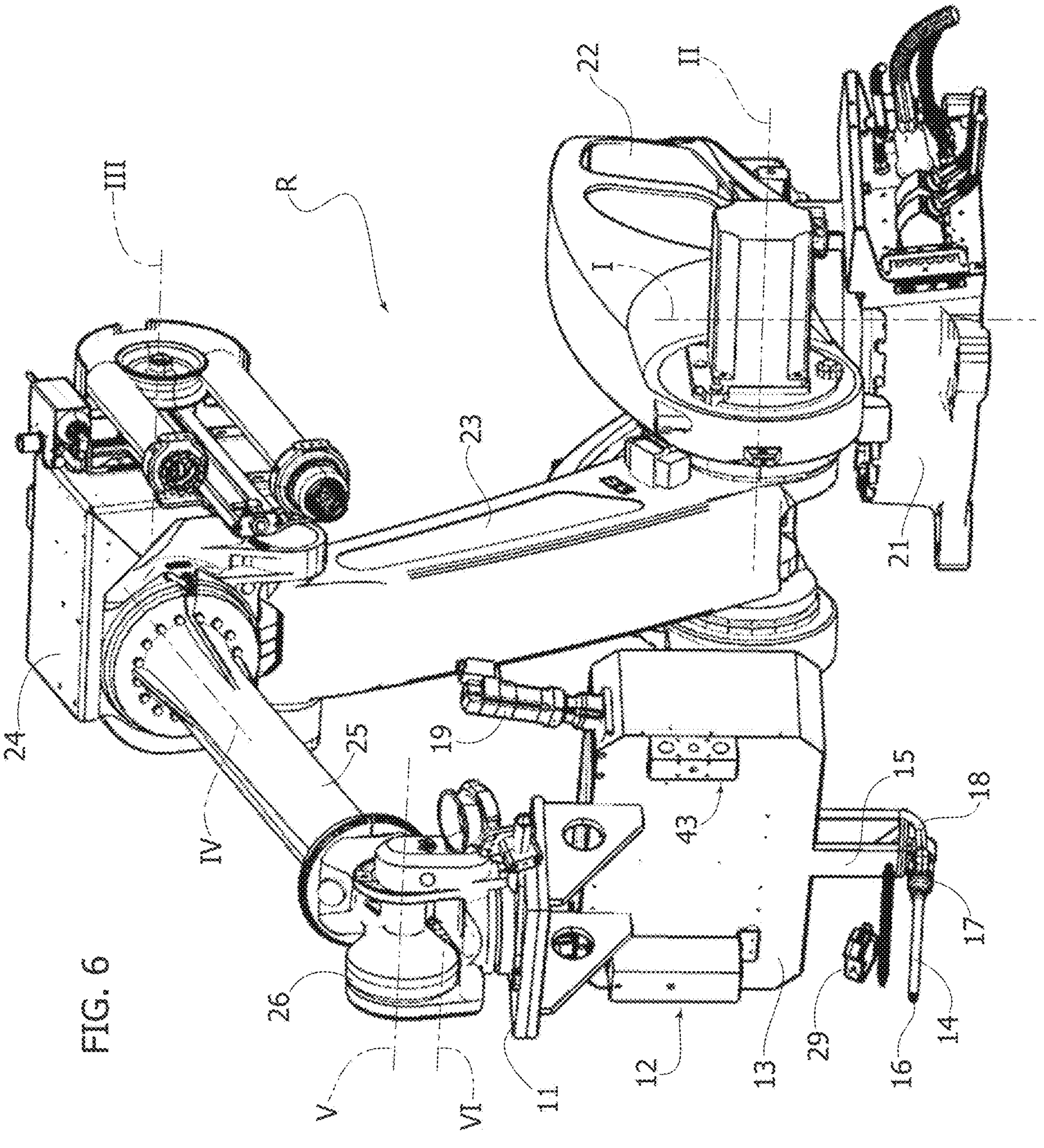
FIG. 6 is a perspective view of a manipulator robot forming part of the system according to the invention.

In the example illustrated in FIG. 6, the sealant dispensing head 12 comprises a casing 13 inside of which the components of the sealant dispensing system are arranged. The casing 13 carries—at the bottom—an elongated sealant dispensing nozzle 14, projecting horizontally from a bracket 15 carried by the casing 13. The dispensing nozzle 14 has a dispensing end or dispensing tip 16 and, at the opposite end, is detachably connected to a connector element 17, which is connected to the sealant supply system arranged inside the casing 13.

Figure 7:
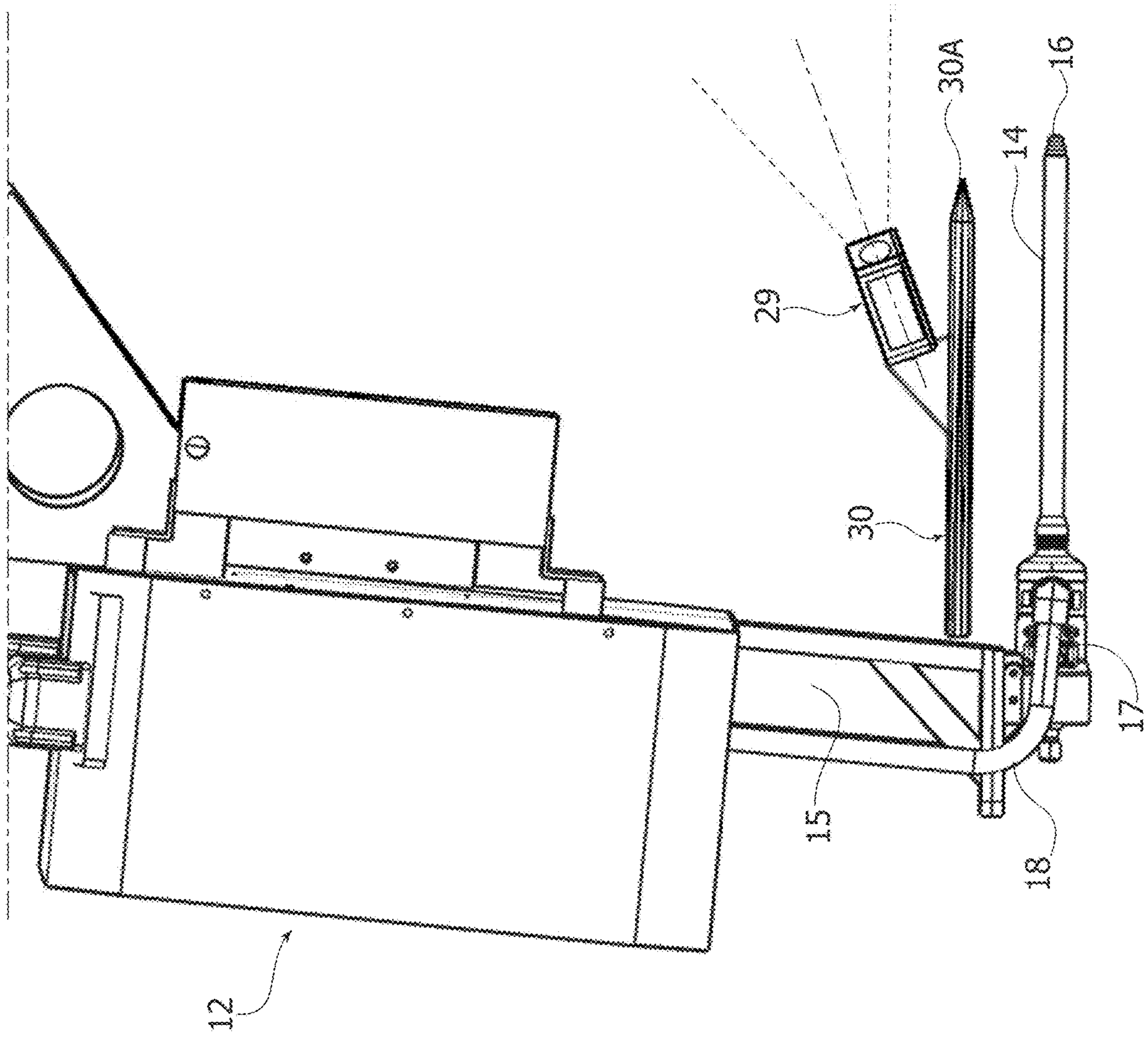
FIG. 7 is an enlarged scale side view of a sealant dispensing head carried by the manipulator robot of FIG. 6.
Figure 7A:
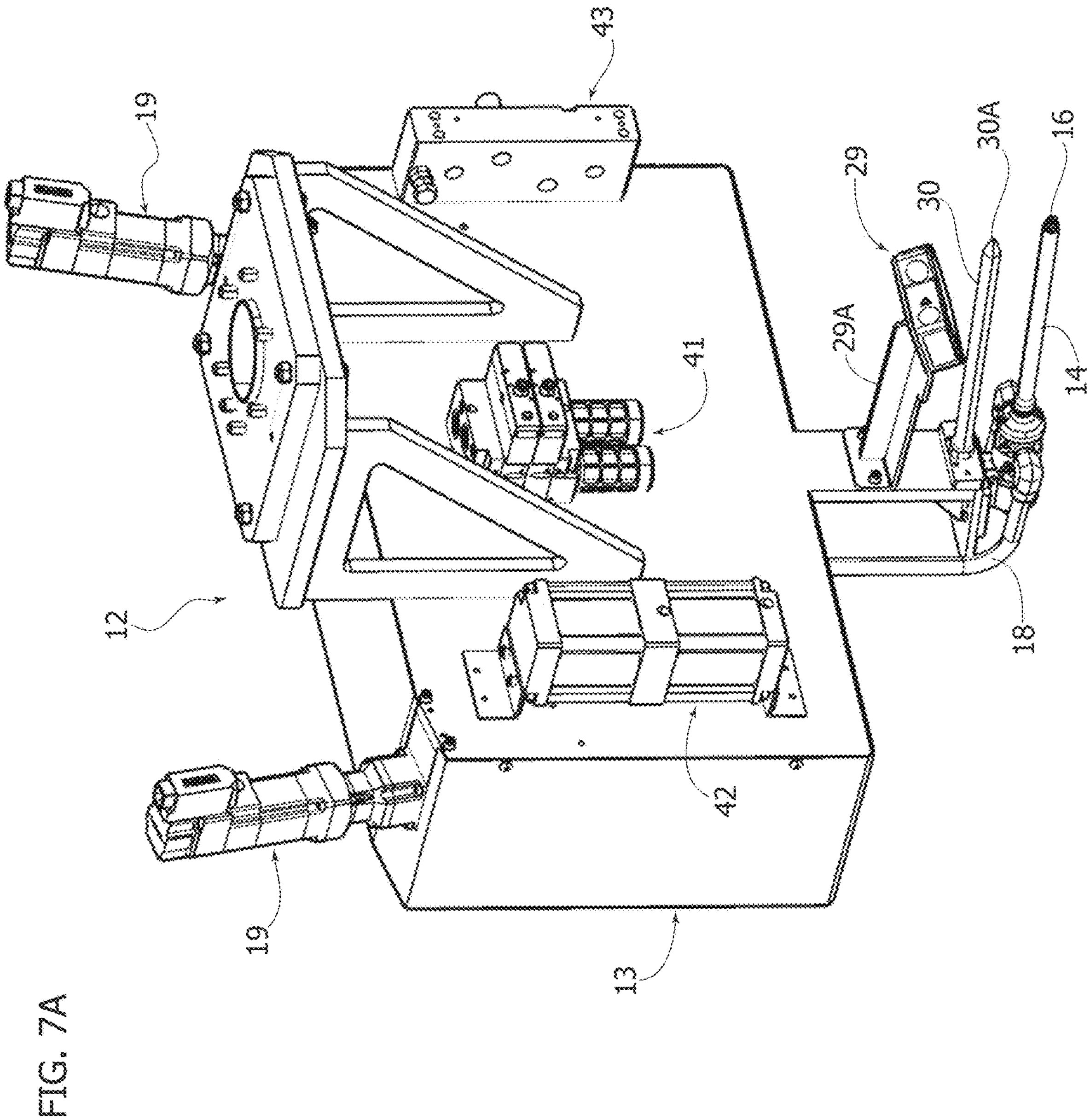
FIGS. 7A, 7B are additional perspective views, with some parts removed for clarity, of the dispensing head of FIG. 7.
Figure 7B:
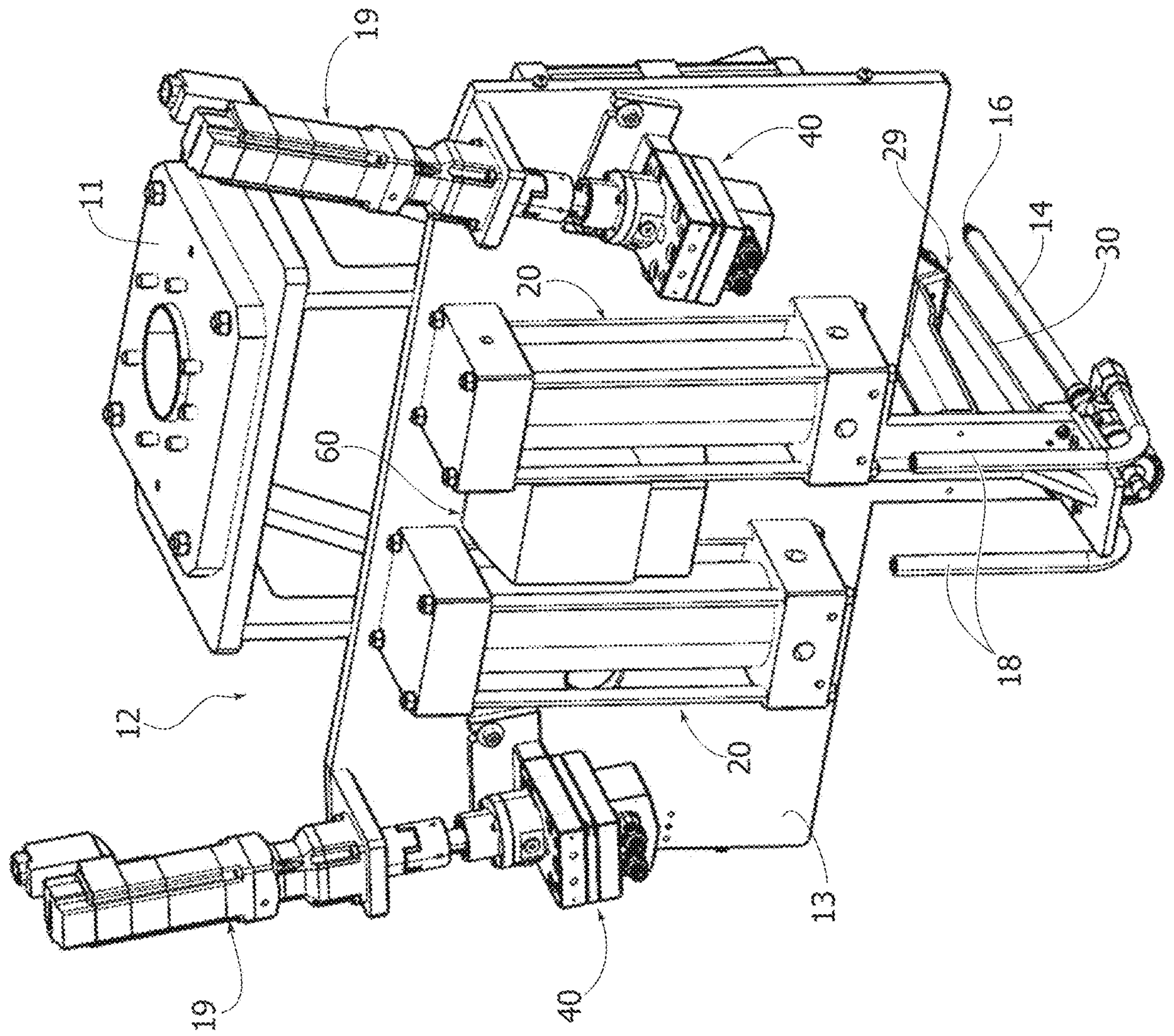

With particular reference to FIGS. 7A, 7B, in the example illustrated in the drawings, the dispensing head 12 is equipped to apply a bead of two-component sealant and—for this purpose—two tanks 20 are arranged inside the casing 13 (FIG. 7B). The fluid contained in each tank 20 may be fed to a respective duct 18 confluent in the dispensing nozzle 14 by a respective volumetric pump 40 operated by a respective servo-controlled electric motor 19. In the example illustrated, the pumps 40 are of the type configured for supplying a constant flow of fluid to the dispensing nozzle 14. In FIG. 7A, the reference 41 indicates an assembly of valves, which establishes a connection of the tanks 20 with the dispensing nozzle 14 during the dispensing step, and a connection of the tanks 20 with a coupling device 43, in a step wherein such coupling device 43 is connected to a stationary apparatus (described in detail below) for refilling the tanks 20. Reference 42 indicates a pneumatic booster for pressurizing the tanks 20. Alternatively, it is possible to use a mechanical pressurization system, for example, a nitrogen cylinder (gas spring) or another known pressurization device.

Thanks to this arrangement, the manipulator robot R is able to move the sealant dispensing head 12 around the container 1 without this movement being hindered by a pipe connecting the dispensing head with a sealant tank arranged stationary on the ground.

Again with reference to FIG. 7B, the dispensing head 12 is provided, in the example illustrated here, with an electrically-operated heating device 60, of any type known per se, to keep the fluid to be dispensed within a suitable range of temperatures. Preferably, the heating device is controlled by an electronic control system on the basis of temperature signals sent to the control system by one or more temperature sensors, arranged along the path of each fluid component.

As can be seen in FIG. 6, in the example illustrated, the manipulator robot R has a base platform 21, a body 22 rotatably mounted on the base platform 21 around a first axis I, an arm 23 rotatably mounted on the body 22 around a second axis II, a body 24 rotatably mounted on the arm 23 around a third axis III, an additional arm 25 rotatably mounted on the body 24 around its axis IV, and a robot wrist 26 carrying the attachment flange 11 by means of two articulation axes V and VI. This conventional robot configuration is, of course, illustrated here purely by way of example.

With reference again to FIGS. 7, 7A and 7B, according to the invention, the dispensing head 12 is provided with a profilometer 29, carried by a support 29A adjacent to the dispensing nozzle 14.

The profilometer 29 is of any known type configured to optically detect the profile of a surface illuminated thereby, thus operating without contact.

Figure 8:
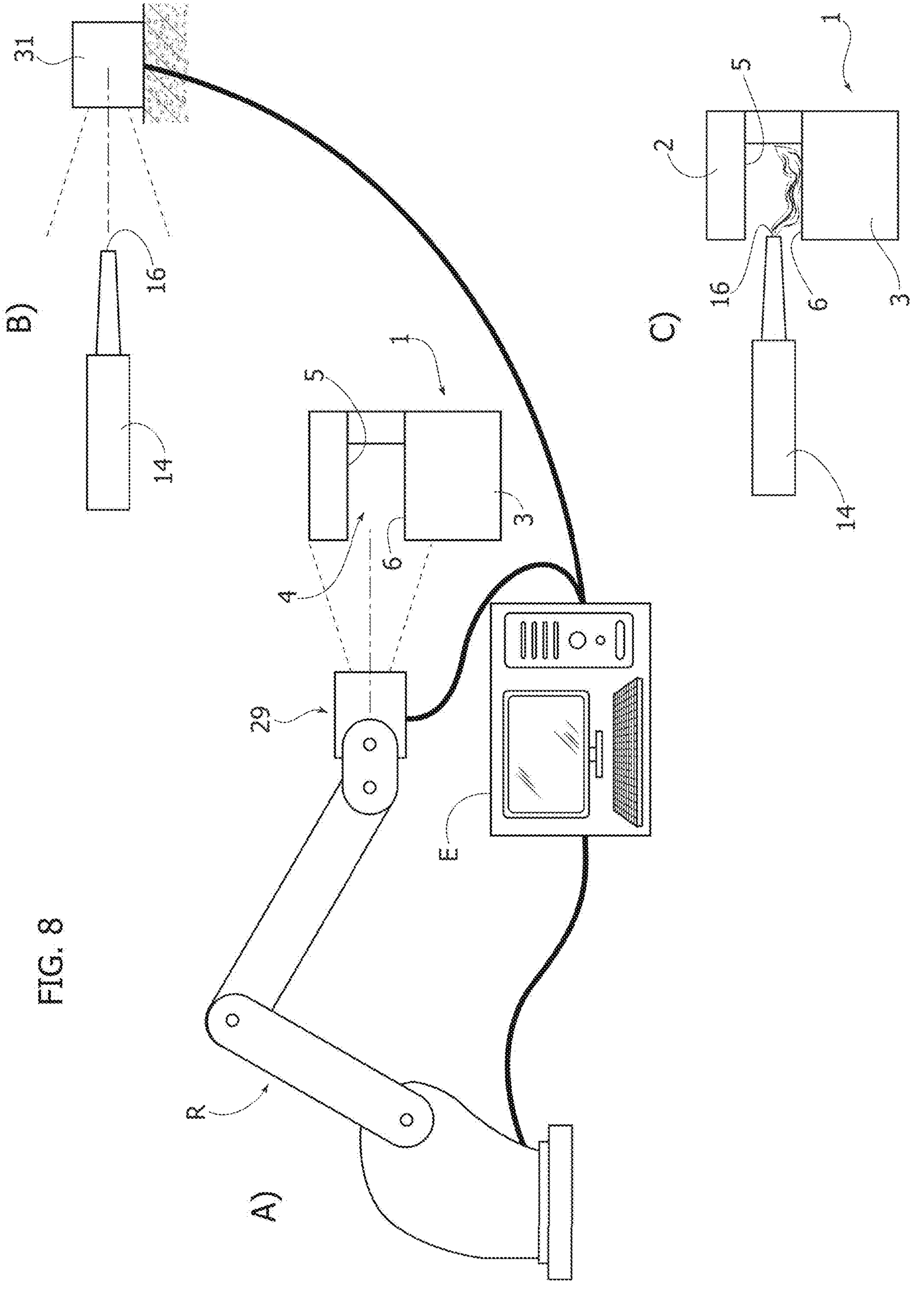
FIG. 8 is a schematic illustration of the main steps A), B), C) of the method according to the invention.

With reference also to FIG. 8, in the method according to the invention, the manipulator robot R moves the dispensing head 12 along the peripheral groove 4 of the container 1 to apply the bead of sealant into the groove 4. However, before carrying out this operation, according to the invention, the robot R (schematically illustrated in FIG. 8) performs a first pass along the peripheral groove 4, without dispensing sealant, to detect the profile of the facing surfaces 5, 6, of the peripheral groove 4, by means of the profilometer 29, and preferably also the profile of the bottom surface of the groove, i.e. the surface that joins the surfaces 5 with 6. This operation is schematically indicated with A) in FIG. 8.

As schematically illustrated in FIG. 8, the robot R is controlled by an electronic controller E, which is also connected (with a cable or wirelessly) with the profilometer 29.

The manipulator robot R moves the sealant dispensing head 12 by carrying out, as indicated, a first pass along the peripheral groove 4 of the container 1 without dispensing sealant, but only for the object of bringing the profilometer 29 to detect the entire perimeter extension of the groove 4.

This operation is made necessary due to the fact that the elements of plastic material constituting the container 1 have a geometry that is not strictly predetermined, so that the profile of the lateral surfaces 5, 6 that delimit the groove 4 varies in an unpredictable way along the perimeter extension of the groove of the same container 1, and from one container to another in a production in series of such containers.

Figure 9:
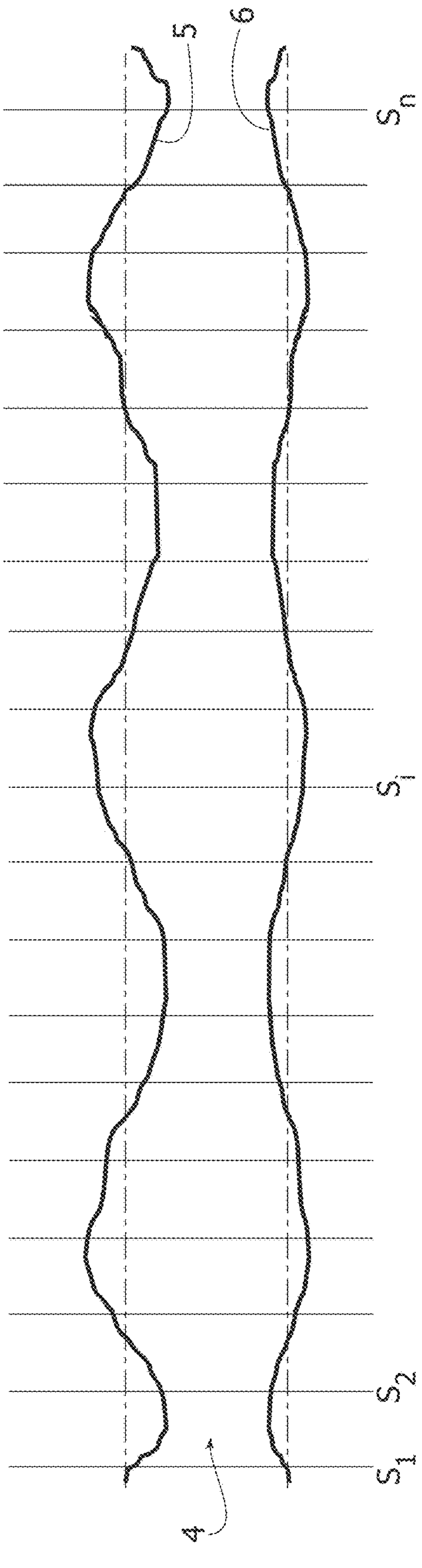
FIG. 9 is a very enlarged scale representation of the profile of the two facing lateral surfaces of the peripheral groove, to which the invention is applied.

FIG. 9 of the attached drawings shows, on a vertically enlarged scale, the profiles of the two surfaces 5, 6 of the groove 4 along the perimeter extension of the groove. As a result of the scanning of the groove 4 carried out by the profilometer 29 moved along the groove 4 by the robot R, the electronic controller E is thus able to store for each section S1, S2, . . . Si . . . , Sn of the peripheral groove 4, the distance between facing surfaces 5, 6.

On the basis of the data detected by the profilometer 29, the electronic controller E is, therefore, able to calculate the correct amount of sealant to be applied in each portion/section of the peripheral groove 4 along the perimeter extension of the peripheral groove 4.

Once these operations have been carried out, the robot R moves the sealant dispensing head 12 by making a second pass along the peripheral groove 4, this time to apply the bead of sealant.

Figure 10:
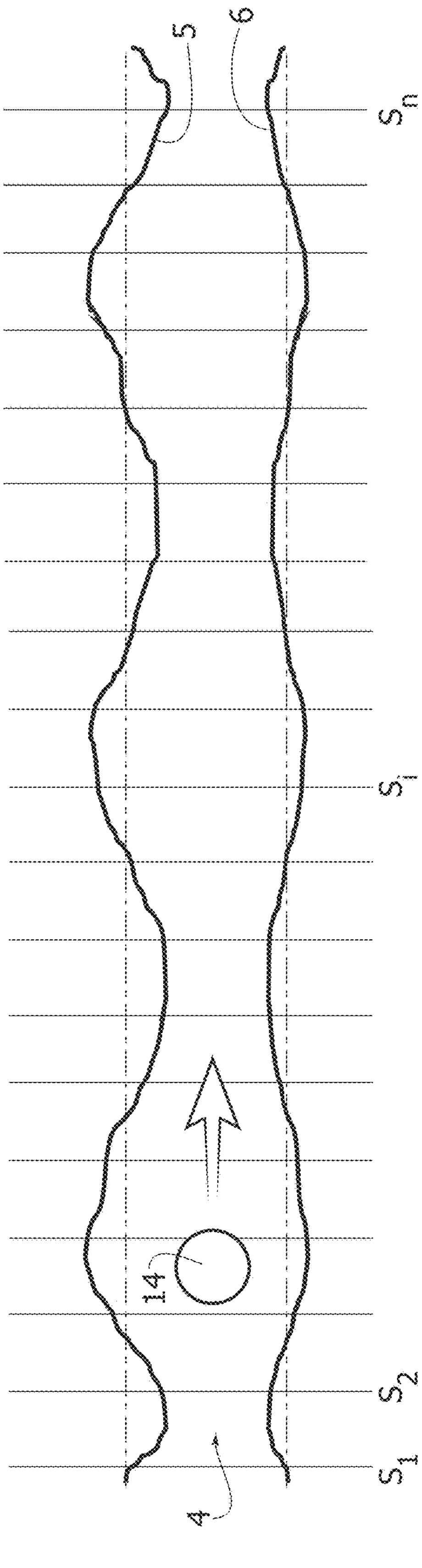
FIG. 10 is an additional view, similar to that of FIG. 9, where the sealant dispensing nozzle is moving along the peripheral groove is also schematically represented.

In the case of the specific example illustrated, the sealant dispensing pump(s) 40 supplies a constant flow of sealant. Therefore, the quantity of the sealant is metered by the electronic controller E by varying the speed of movement of the dispensing nozzle 14 (FIG. 10) along the peripheral groove 4, slowing down the movement of the nozzle 14 in the sections where the distance between the facing surfaces 5, 6 of the groove 4 is higher, and accelerating the movement of the nozzle 14 where the distance between the surfaces 5, 6 is smaller. The speed variation is calculated by the electronic controller E in order to achieve the set goal of an adequate amount of sealant (i.e. neither insufficient nor excessive) in each portion of the peripheral groove 4 of the container 1 (area C) of FIG. 8).

Of course, it would also be possible to control the amount of sealant applied to each portion of the peripheral groove by setting a variation in the flow rate of the sealant delivered by the nozzle. This solution is difficult to implement in the case of a two-component sealant, as the two components fed by the respective pumps 40 mix in a mixer before reaching the nozzle, which makes it difficult to control the flow rate delivered by the nozzle. However, in the case of application of a single-component sealant, it is possible to set up a variable flow pump and control a variation in the flow rate delivered by the nozzle 14 based on the detection using a profilometer 29. In this case, the invention may envisage that the optical detection of the size of the peripheral groove and the application of a variable flow rate of sealant along the perimeter of the peripheral groove are performed in a single pass of the dispensing head.

A further problem that arises with sealant dispensing heads 12 of the type indicated above resides in the fact that the dispensing nozzle 14 tends to become clogged and obstructed, for example, when the sealant dries up during processing breaks. To solve this problem, the nozzle 14 is preferably made of plastic material (in order to be of reduced cost) and is connected in a replaceable manner to the connector 17. However, this expedient gives rise to the further problem due to the fact that the geometry of the nozzle 14 made of plastic material is not rigorously predetermined, since the nozzle made of plastic material is subject to dimensional variations both as a result of manufacturing tolerances that are not particularly narrow, and due to deformations. To overcome this drawback, the sealant dispensing head 12 of the system according to the invention is equipped with a reference element, which in the illustrated example consists of a steel stylus 30 having a rigorously predetermined geometry, projecting parallel to and adjacent to the dispensing nozzle 14 (see in particular FIG. 7A).

Before the second pass for dispensing the sealant in the peripheral groove 4, the robot R places the dispensing nozzle 14 in front of a stationary station on which a vision system device 31 is arranged (area B) of FIG. 8), also connected to the electronic controller E. This operation is performed to allow the electronic controller to know the position of the dispensing end or dispensing tip 16 of the dispensing nozzle 14 with respect to the X, Y, Z coordinate system. In this way, it is not necessary to carry out a zeroing operation of the position of the robot with respect to the X, Y, Z coordinate system, even using nozzles of poor material, which can be replaced frequently, having a geometry that is not strictly predetermined.

In the case of the example, as indicated above, the steel stylus 30 is arranged parallel and adjacent to the dispensing nozzle 14 and has a tip 30A whose position with respect to the robot R is known to the electronic controller E. After a replacement of the dispensing nozzle 14, the robot R carries the two tips 16, 30A of the nozzle 14 and of the steel stylus 30, respectively, in front of the vision system 31, which detects the relative position of the tip 16 of the dispensing nozzle 14 with respect to the tip 30A of the steel stylus 30. The data relating to the aforesaid relative position are sent to the electronic controller E, which can consequently control the robot R, taking into account the actual position of the dispensing tip 16 of the dispensing nozzle 14. The unique characteristic of this measurement method is that of being able to eliminate the positioning error of the nozzle with respect to the vision system when resetting the position of the nozzle 14, as the system measures the position of the nozzle 14 with respect to the stylus 30, thus providing data free from any robot positioning errors during this measurement.

Again with reference to FIGS. 3-5, in the case of the illustrated example, the robot R has its base slidably mounted on a guide 32 parallel to the longitudinal direction of the working area A in the processing station, so that the robot R may move along the guide 32 in order to more easily follow the perimeter extension of the peripheral groove 4.

Figure 11:
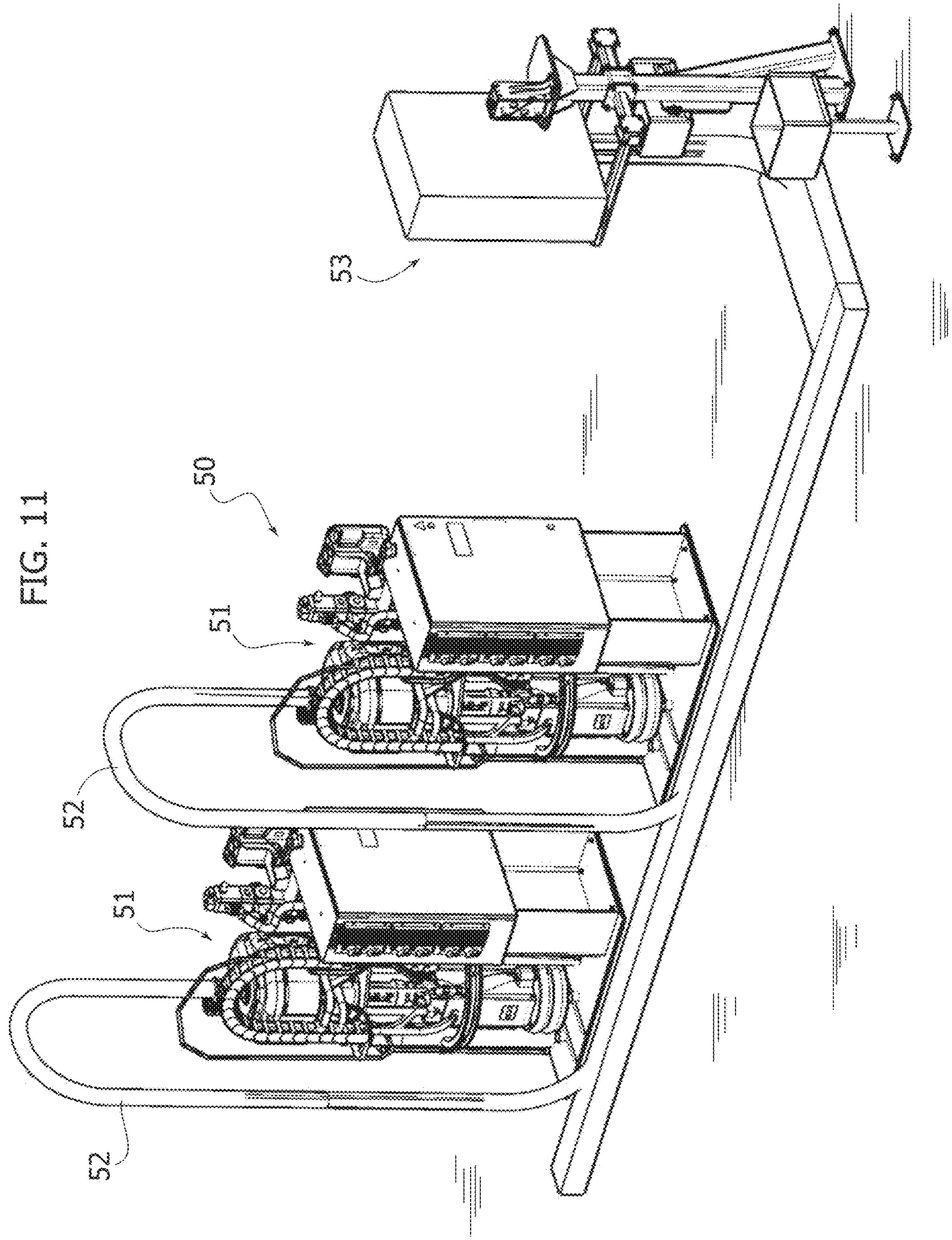
FIG. 11 is a perspective view of a refilling station, at which it is possible to refill the sealant tanks on board the sealant dispensing head.

FIG. 11 shows an example of a refilling station, to which the dispensing head 12 can be carried by the robot R to perform refilling of the sealant tanks 20 on-board the robot. As already indicated several times, the illustration refers to the example wherein two tanks 20 are arranged on the dispensing head 12, for two different fluids that make up the sealant fluid dispensed by the nozzle 14. Of course, the dispensing head 12 could be arranged with a single tank, for dispensing a single-component sealant.

In the case of the example, the refilling station, indicated in its entirety by 50, comprises two extrusion pumping units 51, of any known type (and, therefore, not described in detail here), which feed respective fluid components into two supply pipes 52 connected to an apparatus 53 interfacing with the dispensing head 12.

Figure 12:
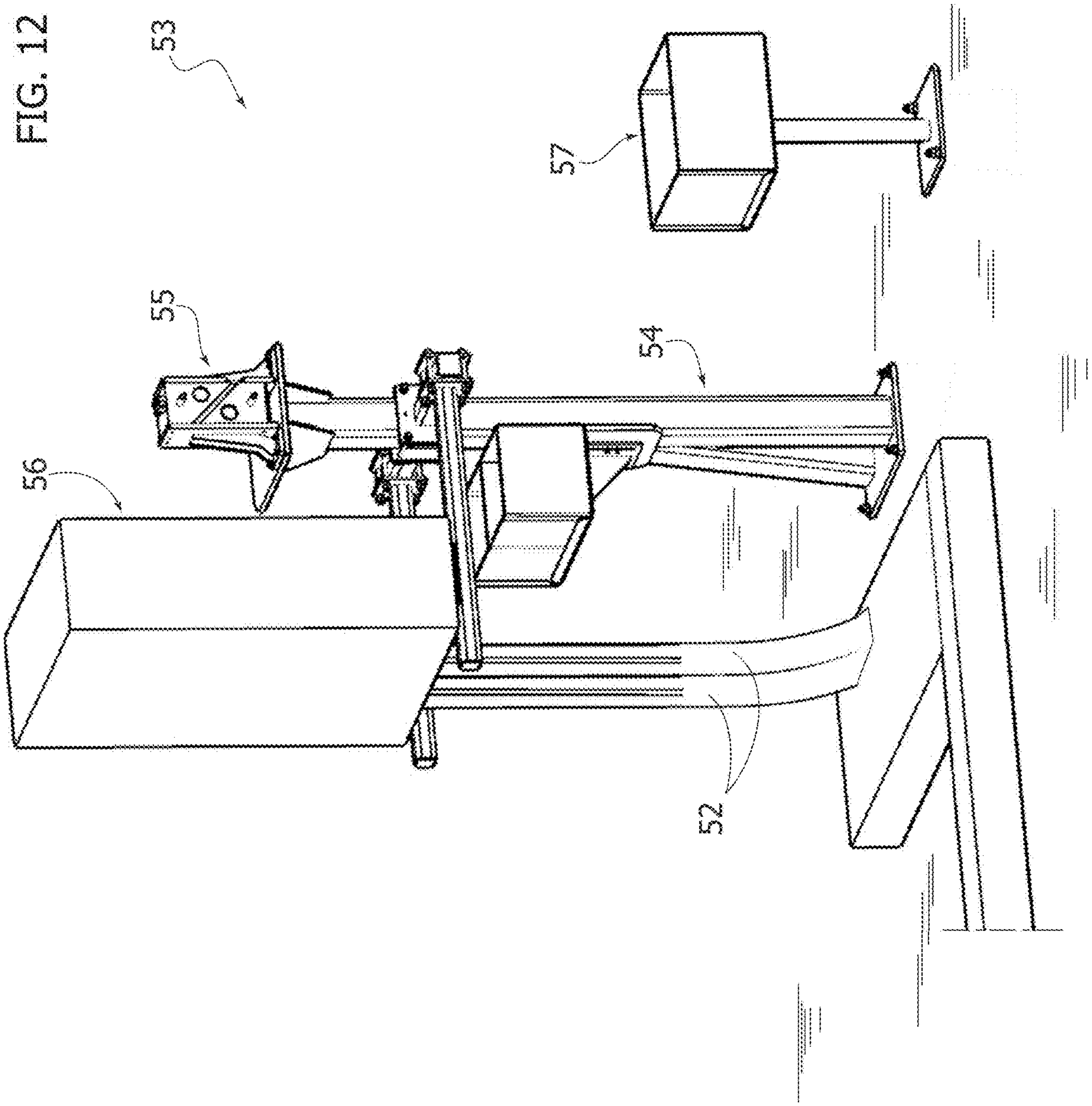
FIG. 12 is a perspective view of an apparatus forming part of the refilling station, for coupling with the dispensing head and controlling the refilling step.

With reference to FIG. 12, the apparatus 53 interfacing with the dispensing head 12 comprises a support structure 54 carrying a coupling device 55 having two quick coupling connectors, of any known type, intended to be coupled with the corresponding connectors of the coupling device 43 carried by the dispensing head 12 (FIG. 7A). For greater clarity of illustration, FIG. 12 does not show the connection pipes between the coupling device 55 and the pipes 52 coming from the pumping units 51.

A control panel 56 and a container 57 for collecting purges of sealant are arranged adjacent to the coupling device 55.

Of course, without prejudice to the principle of the invention, the details of construction and the embodiments may vary widely with respect to those described purely by way of example, without departing from the scope of the present invention, as defined by the attached claims.

The invention claimed is:

1. A system for automatically applying a bead of sealant within a peripheral groove, which is defined between two elements coupled to each other, wherein said peripheral groove has two facing lateral surfaces each having a profile that is continuously variable along a perimeter of the peripheral groove, said system comprising:

a manipulating robot connected to a sealant dispensing head, the sealant dispensing head comprising:

a sealant dispensing nozzle comprising an element of plastic material mounted in a replaceable manner, having a geometry that is subject to dimensional variations;

a reference element, having a predetermined geometry, positioned adjacent to the sealant dispensing nozzle;

a pump configured to feed a sealant to the sealant dispensing nozzle, coming from one or more sealant tanks; and a profilometer of a type having contactless operation and positioned adjacent to the dispensing nozzle;

an electronic controller programmed to move the sealant dispensing head along said peripheral groove and to simultaneously control said pump so as to apply the bead of sealant within the peripheral groove, wherein the reference element having a position with respect to the manipulating robot which is known by said electronic controller; and a vision system configured to detect a relative position of a dispensing end of the sealant dispensing nozzle with respect to the reference element, and to send data indicative of said detected relative position, free from robot positioning errors, to the electronic controller, wherein the electronic controller is programmed for:

controlling a first pass of the sealant dispensing head along the peripheral groove, without dispensing the sealant, while activating the profilometer to detect the profiles of the two facing lateral surfaces of each portion of the peripheral groove, along the perimeter of the peripheral groove, processing data relating to the profiles of the two lateral surfaces of the peripheral groove, as detected by the profilometer in the first pass, and calculating a correct quantity of the sealant to be applied within each portion of the peripheral groove along the perimeter of the peripheral groove, and controlling a second pass of the sealant dispensing head along the peripheral groove, while dispensing the sealant in the calculated quantity in each portion of the peripheral groove along the perimeter of the peripheral groove.

2. The system according to claim 1, wherein said pump is configured to activate a constant and predetermined delivery flow rate of the sealant, and the electronic controller is configured to vary a speed of movement of the sealant dispensing nozzle during the second pass, so as to apply the calculated quantity of the sealant in each portion of the peripheral groove along the perimeter of the peripheral groove.

3. The system according to claim 1, further comprising:

an electronically-controlled system configured to locate the two elements defining the peripheral groove in a predetermined position at a work area.

4. The system according to claim 1, wherein the one or more sealant tanks are positioned on and connected to the sealant dispensing head, and are of a refillable or replaceable type, so that movements of the robot are not hindered by pipes connected between the one or more sealant tanks and a stationary sealant tank.

5. The system according to claim 1, wherein the manipulating robot is slidably mounted on a guide positioned in a working area, the guide is positioned parallel to a longitudinal direction of the working area.

6. The system of claim 1, wherein the sealant comprises a mono-component sealant.

7. The system of claim 1, wherein the sealant comprises a two-component sealant.

8. The system of claim 7, wherein the two-component sealant further comprises a fluid having sealing properties.

9. The system of claim 7, wherein the two-component sealant further comprises a fluid having adhesive properties.

10. The system of claim 7, wherein the two-component sealant further comprises a fluid having sealing properties and adhesive properties.

* * * * *